(12) United States Patent
Sugimura

(10) Patent No.: US 12,535,135 B2
(45) Date of Patent: Jan. 27, 2026

(54) BOOT

(71) Applicant: HI-LEX CORPORATION, Hyogo (JP)

(72) Inventor: Masachika Sugimura, Hyogo (JP)

(73) Assignee: HI-LEX CORPORATION, Hyogo (JP)

( * ) Notice: Subject to any disclaimer, the term of this patent is extended or adjusted under 35 U.S.C. 154(b) by 0 days.

(21) Appl. No.: 18/699,733

(22) PCT Filed: Oct. 21, 2022

(86) PCT No.: PCT/JP2022/039208
§ 371 (c)(1),
(2) Date: Apr. 9, 2024

(87) PCT Pub. No.: WO2023/068349
PCT Pub. Date: Apr. 27, 2023

(65) Prior Publication Data
US 2025/0243934 A1    Jul. 31, 2025

(30) Foreign Application Priority Data
Oct. 21, 2021   (JP) .................. 2021-172439

(51) Int. Cl.
*F16J 3/04*    (2006.01)
*F16J 15/52*   (2006.01)

(52) U.S. Cl.
CPC .............. *F16J 3/041* (2013.01); *F16J 15/52* (2013.01)

(58) Field of Classification Search
CPC ................... F16J 3/041; F16J 15/52
See application file for complete search history.

(56) References Cited

U.S. PATENT DOCUMENTS 4,560,178 A * 12/1985 Hempel .................. F16D 3/845
                                                    74/18.2
5,051,105 A *  9/1991 Sugiura .................... F16J 3/041
                                                    277/637

(Continued)

FOREIGN PATENT DOCUMENTS

JP    2006057685 A    3/2006
JP    2007504410 A    3/2007

(Continued)

OTHER PUBLICATIONS

International Search Report from corresponding PCT Application No. PCT/JP2022/039208, Dec. 6, 2022.

(Continued)

*Primary Examiner* — Nicholas L Foster
(74) *Attorney, Agent, or Firm* — Workman Nydegger

(57) ABSTRACT

A boot of extends along an axis X direction and has a cylindrical shape that is extendable and contractable in the axis X direction. The boot includes a bellows portion alternately having a bellows portion-side peak portion and a bellows portion-side valley portion along the axis X direction, and an extending portion connected adjacent to the bellows portion in the axis X direction and provided adjacent to one end and/or an other end of the boot in the axis X direction. The extending portion is formed so that an outer diameter of an end of the extending portion on a side opposite to a side connected to the bellows portion in the axis X direction is smaller than an inner diameter of the bellows portion-side valley portion of the bellows portion.

7 Claims, 8 Drawing Sheets

(56) References Cited

U.S. PATENT DOCUMENTS

| | | | |
|---|---|---|---|
| 5,176,390 A * | 1/1993 | Lallement | F16J 3/041 403/50 |
| 5,562,005 A * | 10/1996 | Boyen | F16J 3/042 277/944 |
| 6,715,771 B2 * | 4/2004 | Miyamoto | F16D 3/845 277/635 |
| 6,921,091 B2 * | 7/2005 | Neviani | F16J 3/042 277/634 |
| 7,296,802 B2 * | 11/2007 | Ota | F16J 3/041 403/50 |
| 7,955,179 B2 * | 6/2011 | Satoh | F16D 3/845 464/175 |
| 11,761,492 B2 * | 9/2023 | Yoshinaga | F16D 3/845 464/175 |
| 2002/0185825 A1 * | 12/2002 | Miyamoto | F16D 3/845 277/636 |
| 2005/0121860 A1 * | 6/2005 | Ota | F16J 3/041 277/635 |
| 2006/0040752 A1 | 2/2006 | Ishijima et al. | |
| 2008/0194344 A1 | 8/2008 | Niederhufner et al. | |
| 2009/0131180 A1 * | 5/2009 | Satoh | F16D 3/845 464/175 |
| 2014/0084599 A1 | 3/2014 | Beck | |
| 2020/0191216 A1 | 6/2020 | Takeuchi | |
| 2021/0123481 A1 * | 4/2021 | Yoshinaga | F16D 3/845 |

FOREIGN PATENT DOCUMENTS

| | | |
|---|---|---|
| JP | 2010151162 A | 7/2010 |
| JP | 201443891 A | 3/2014 |
| JP | 2020094693 A | 6/2020 |

OTHER PUBLICATIONS

Japanese Office Action from Corresponding Japanese Patent Application JP2021172439, Apr. 15, 2024.

* cited by examiner

BOOT

TECHNICAL FIELD

The present invention relates to a boot.

BACKGROUND ART

When a forward/backward movement member moves forward/backward with respect to a target member, a bellows-shaped boot that is extendable and contractable in a forward/backward direction is used to protect the forward/backward movement member and the target member from water and dust at a connection portion between the advancing/retracting member and the target member. For example, Patent Document 1 discloses a boot (referred to as a sealing in Patent Document 1) that is applied to an opening/closing device for a fuel lid of an automobile. The boot in Patent Document 1 is mounted to a tappet (forward/backward movement member) fixed to a flap that is a fuel lid, and when the tappet moves forward/backward with respect to a housing (target member) provided in an automobile body, the boot is used to protect a tappet shank of the tappet and an opening of the housing into which the tappet shank is inserted. One end of the boot is mounted to a tappet head of the tappet so as to accommodate the tappet shank within the boot, and the other end of the boot is a free end. When the flap is brought into a closed state, the other end of the boot abuts onto the housing, so that the boot forms a closed space for protecting the tappet shank and the opening of the housing. Then, when the tappet shank is inserted deeper into the housing, the boot maintains the closed space while the boot is compressed in the forward/backward direction.

PRIOR ART DOCUMENT

Patent Document 1: US 2014/084599 A

SUMMARY OF THE INVENTION

Problems to be Solved by the Invention

In Patent Document 1, when the flap is opened, the flap is separated from the housing, and the other end of the boot turns into a state where the other end of the boot does not abut onto the housing and is into an opened state. The boot is preferably longer than the tappet shank accommodated therein, in order to protect the tappet shank as much as possible in such states.

When the flap is brought into a closed state, a tip side of the tappet shank is inserted into the housing, and the boot is compressed between the flap and the housing. In a case where a boot installation space is narrow, such as for the fuel lid opening/closing device or the like, it is desired that the length of the compressed boot is shorter.

Further, when the flap is in the closed state, a restoring force acts on the flap in an opening direction due to a boot reaction force in the compressed state, and the flap may be lifted off of the automobile body. Therefore, it is preferable that an increase in restoring force caused by compression of the boot is suppressed.

It is an object of the present invention to provide a boot that has a short boot length when compressed and suppresses an increase in restoring force by being compressed.

Means to Solve the Problem

The boot of the present invention is a tubular boot that extends along an axis direction and is extendable and contractable in the axis direction, the boot comprising a bellows portion alternately having a bellows portion-side peak portion and a bellows portion-side valley portion along the axis direction, and an extending portion connected adjacent to the bellows portion in the axis direction and provided adjacent to one end and/or an other end of the boot in the axis direction, wherein the extending portion is formed so that an outer diameter of an end opposite to a side connected to the bellows portion in the axis direction, of the extending portion, is smaller than an inner diameter of the bellows portion-side valley portion of the bellows portion, and wherein the extending portion is configured so that at least a part of the extending portion is displaced into the bellows portion when the boot is compressed in the axis direction.

Effects of the Invention

According to the present invention, it is possible to provide a boot that has a short boot length when compressed and suppresses an increase in restoring force by being compressed.

EMBODIMENT FOR CARRYING OUT THE INVENTION

The boot according to one embodiment of the present invention will be described below with reference to the drawings. However, embodiments shown below are merely examples, and the boot of the present invention is not limited to the following embodiments. In the present specification, "perpendicular to A" and similar expressions do not only refer to a direction strictly perpendicular to A, but also refer to the direction including being substantially perpendicular to A. Moreover, in the present specification, "parallel to B" and similar expressions do not only refer to a direction strictly parallel to B, but also refer to the direction including being substantially parallel to B. In addition, in the present specification, "C-shape" and similar expressions do not only refer to a strict C-shape, but also refer to the shape including a shape visually associated with a C-shape (substantially a C-shape).

Figure 1:
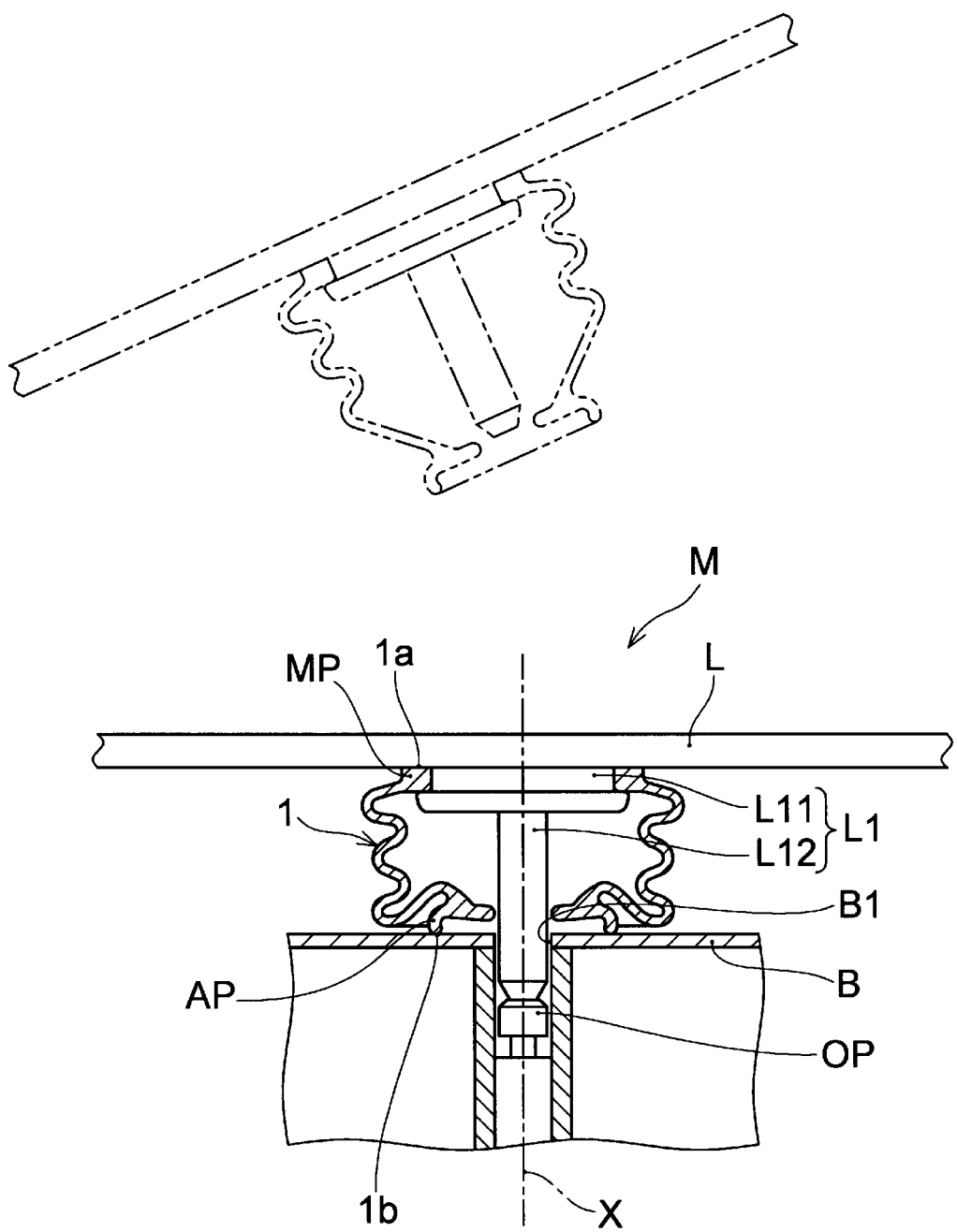
FIG. 1 is a schematic view showing a lid opening/closing device to which a boot according to one embodiment of the present invention is mounted.
Figure 2:
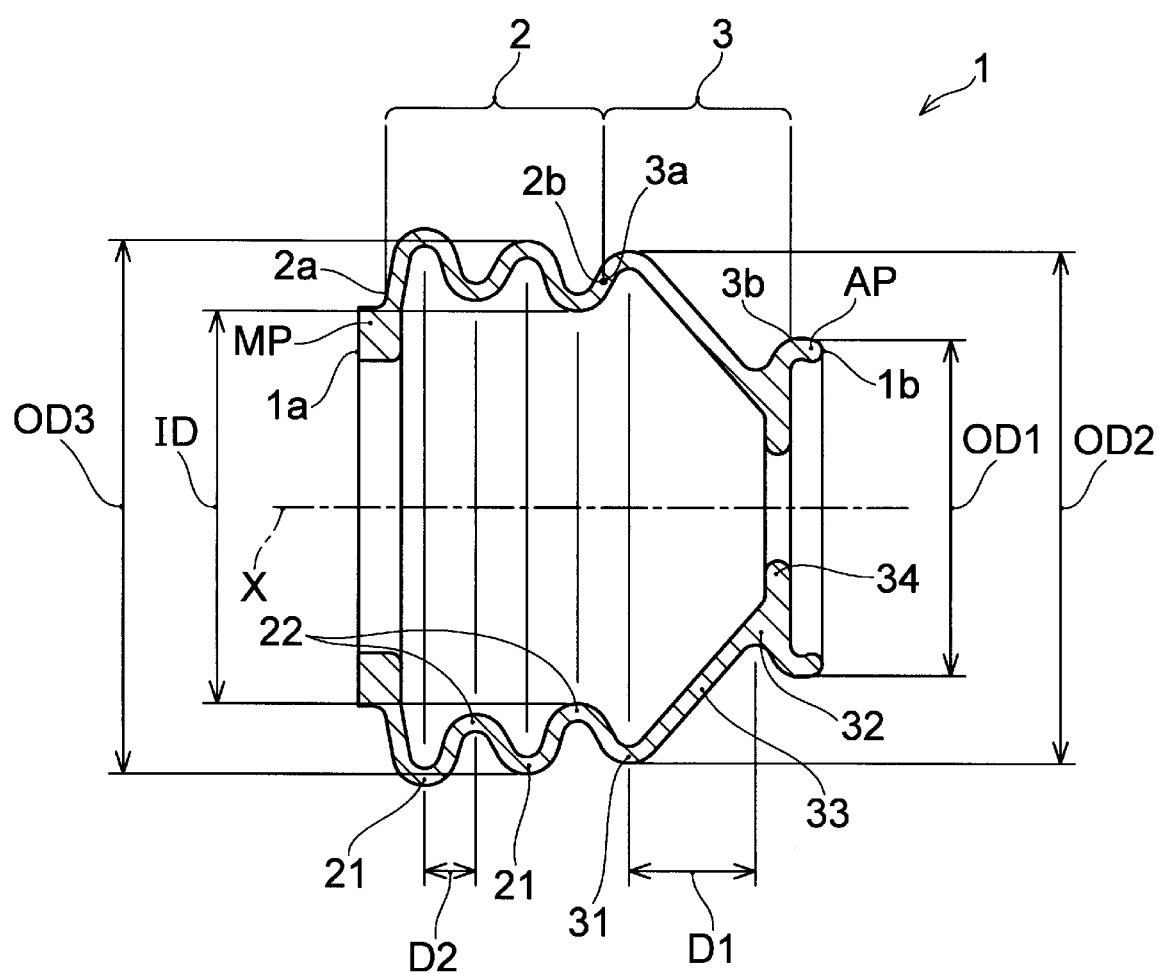
FIG. 2 is a sectional view of a boot according to one embodiment of the present invention.

As shown in FIGS. 1 and 2, the boot 1 of the present embodiment is a tubular boot that extends along an axis X direction from one end 1a to an other end 1b in the axis X direction, which is a central axis of the boot 1, and that is extendable and contractable in the axis X direction. The boot 1 is configured to be able to transition between an extended state where the boot 1 is extended in the axis X direction (state indicated by the two-dot chain line in FIG. 1) and a compressed state where the boot 1 is compressed in the axis X direction (state indicated by the solid line in FIG. 1). The boot 1 protects an internal space on an inner side in a radial direction of the boot 1 and optionally another space communicating with the internal space (for example, if the boot 1 is connected to a tubular member different from the boot 1, an internal space of the different tubular member) from an external environment (for example, suppresses water, dust, etc. from entering), in the extended and compressed states. The boot 1 is mounted to, for example, a mounting target, and protects a predetermined portion of the mounting target arranged in the internal space and optionally in another space from the external environment. The boot 1 can be applied to any mounting target that requires protection, without particular limitations, as long as the boot 1 can protect a particular portion of the mounting target to which the boot 1 is mounted.

For example, as shown in FIG. 1, the boot 1 is applied to a mounting target M having a base B and a movable portion L that is movable between a distal position (position indicated by the two-dot chain line in FIG. 1) and a proximal position (position indicated by the solid line in FIG. 1) with respect to the base B. The boot 1 is mounted to the mounting target M so that one end 1a of the boot 1 in the axis X direction is mounted to the movable portion L and the other end 1b of the boot 1 in the axis X direction constitutes a released free end when the movable portion L is in the distal position. The boot 1 is arranged so that the other end 1b of the boot 1 abuts onto the base B when the movable portion L approaches the base B from the distal position toward the proximal position. With the other end 1b of the boot 1 abutting onto the base B, the boot 1 covers an opening B1 provided on the base B. The boot 1 is in an extended state of its natural length until the movable portion L approaches the base B to reach a position where the boot 1 abuts onto the base B, and transitions to a compressed state (state indicated by the solid line in FIG. 1) where the boot 1 is compressed between the movable portion L and the base B in the axis X direction when the movable portion L moves further from that position toward the proximal position. During transition between the extended state and the compressed state with the boot 1 abutting onto the base B, the boot 1 covers the opening B1 of the base B to protect the inside of the opening B1 from the external environment (for example, suppress water, dust, etc. from entering). Conversely, when the movable portion L moves from the proximal position to the distal position, the boot 1 is restored to the extended state by a restoring force of the boot 1 itself. However, the boot 1 may be mounted to the mounting target M so that the other end 1b of the boot 1 is mounted to the base B and the boot 1 is extended and contracted by relative movement between the movable portion L and the base B.

The mounting target M is not particularly limited, examples of which include, for example, a lid opening/closing device M that opens and closes a lid L, for refueling or power-supplying a vehicle, as shown in FIG. 1. As shown in FIG. 1, the lid opening/closing device M, which is a mounting target, comprises a part of a vehicle body that is a base (hereinafter referred to as a vehicle body B) and a lid L that is a movable portion that opens and closes a refueling or power-supplying space (space between the lid L and the vehicle body B indicated by the solid line in FIG. 1) adjacent to a refueling or power-supplying port provided in the vehicle body. The lid L is configured to be movable between an opened position that opens the refueling or power-supplying space (distal position, a position indicated by the two-dot chain line in FIG. 1) and a closed position that closes the refueling or power-supplying space (proximal position, a position indicated by the solid line in FIG. 1). The lid L is further configured to be able to move to an advanced position further on the vehicle body B side relative to the closed position (position further below from the position indicated by the solid line in FIG. 1) by being further pressed toward the vehicle body B when the lid L is in the closed position.

The lid opening/closing device M further has a locking member (not shown) that locks/unlocks the lid L with respect to the vehicle body B, a locking member drive section (not shown) that moves the locking member to locking and unlocking positions, and an operation portion OP (see FIG. 1) that is operated to drive the locking member drive section. As shown in FIG. 1, the lid L is provided with a boot-mounting member L1 to which one end 1a of the boot 1 in the axis X direction is mounted. The boot-mounting member L1 has a mounted portion L11 to which one end 1a of the boot 1 is mounted and a pressing portion L12 that presses the operation portion OP in order to operate the operation portion OP. When the lid L is in the closed position, the lid L is further pressed toward the vehicle body B to move to the advanced position, thereby pressing the operation portion OP via the pressing portion L12 (pressing it downward in FIG. 1). When the operation portion OP is pressed, the operation portion OP is operated to drive the locking member drive section having a motor, etc. The locking member, which is operated by driving the locking member drive section, moves between a locking position where the locking member engages with the lid L to allow the lid L to be locked in the closed position and an unlocking position where the locking member is disengaged from the lid L to allow the lid L to be moved to the opened position.

In the lid opening/closing device M, as the lid L moves, the boot 1 mounted to the lid L also moves. The boot 1 covers the opening B1 of the vehicle body B as the other end 1b of the boot 1 abuts onto the vehicle body B in the middle of movement of the lid L from the opened position to the closed position. When the lid L is located between a position when the other end 1b of the boot 1 abuts onto the vehicle body B and the closed position (and the advanced position), the boot 1 covers the opening B1 of the vehicle body B in the compressed state where the boot 1 is compressed in the axis X direction to suppress water, dust, etc. from entering the locking member drive section, etc. provided in the vehicle body B through the opening B1. Conversely, when the lid L moves from the closed position (and the advanced position) to the opened position, the boot 1 is separated from the vehicle body B and restored to the extended state by the restoring force of the boot 1 itself. It is to be noted that the base B onto which the boot 1 abuts may be a housing that may be mounted to the vehicle body and may accommodate the locking member, the locking member drive section, and the operation portion OP.

As shown in FIG. 2, the boot 1 comprises a bellows portion 2 alternately having a bellows portion-side peak portion 21 and a bellows portion-side valley portion 22 along the axis X direction, and an extending portion 3 connected adjacent to the bellows portion 2 in the axis X direction and provided adjacent to the other end 1b of the boot 1 in the axis X direction. The boot 1 is configured to be extendable and contractible in the axis X direction by the bellows portion 2 and the extending portion 3 extending and contracting in the axis X direction. In the present embodiment, the boot 1 is provided with a mounting portion MP that is mounted to the movable portion L of the mounting target M at one end 1a of the boot 1 and an abutting portion AP that can abut onto the base B of the mounting target M at the other end 1b of the boot 1.

As shown in FIG. 1, when the boot 1 is used to be mounted to the lid opening/closing device M that is a mounting target, the mounting portion MP is a portion that is mounted to the mounted portion L11 of the boot-mounting member L1 provided on the lid L that is a movable portion. The mounting portion MP is configured to be able to fit onto the mounted portion L11 of the boot-mounting member L1 and is fitted onto the mounted portion L11 to be mounted to the mounted portion L11. As shown in FIG. 2, the mounting portion MP is provided at one end 1a of the boot 1 in the axis X direction and connected to the bellows portion 2 in the axis X direction. The mounting portion MP is formed into an annular shape and constitutes an opening that communicates with the internal space on the inner side in the radial direction of the boot 1 at one end 1a of the boot 1. When the mounting portion MP is fitted onto the mounted portion L11 of the boot-mounting member L1, the opening at one end 1a of the boot 1 is closed from the external environment. The mounting portion MP can be formed of an elastically deformable rubber, synthetic resin, or the like, but not particular limited as long as the mounting portion MP is formed so that the boot 1 is suppressed from coming off from the mounted portion L11 even if the boot 1 is extended or contracted, in a state where the mounting portion MP is fitted onto the mounted portion L11 of the boot-mounting member L1. However, one end 2a of the bellows portion 2 may constitute one end 1a of the boot 1 and may be mounted to the mounted portion L11 of the boot-mounting member L1.

As shown in FIG. 1, when the boot 1 is used to be mounted to the lid opening/closing device M that is a mounting target, the abutting portion AP is a portion that abuts onto the vehicle body B by the lid L approaching the vehicle body B that is a base. As shown in FIG. 2, the abutting portion AP is provided at the other end 1b of the boot 1 in the axis X direction and connected to the extending portion 3 in the axis X direction. The abutting portion AP is formed into an annular shape and constitutes an opening that communicates with the internal space on the inner side in the radial direction of the boot 1 at the other end 1b of the boot 1. With the abutting portion AP abutting onto the vehicle body B, the opening at the other end 1b of the boot 1 is closed from the external environment. The abutting portion AP can be formed of an elastically deformable material such as rubber, synthetic resin, or the like, without particular limitations, as long as the abutting portion AP can abut onto the vehicle body B and is formed so that the abutting portion AP is suppressed from being released from the abutting state onto the vehicle body B even if the boot 1 is extended and contracted. However, an other end 3b of the extending portion 3 may constitute the other end 1b of the boot 1 and may be configured to abut onto the vehicle body B.

As shown in FIG. 2, the bellows portion 2 is a portion that is formed into a hollow tubular shape extending along the axis X direction between one end 2a and the other end 2b and is configured to be extendable and contractible in the axis X direction. One end 2a of the bellows portion 2 is directly or indirectly (directly in the present embodiment) connected to the mounting portion MP, and the other end 2b of the bellows portion 2 is directly or indirectly (directly in the present embodiment) connected to one end 3a of the extending portion 3. Although the bellows portion 2 is formed integrally with the mounting portion MP and the extending portion 3 in the present embodiment, the bellows portion 2 may be formed separately from the mounting portion MP and the extending portion 3. When the boot 1 is used to be mounted to the lid opening/closing device M that is a mounting target, the bellows portion 2 is compressed as the boot 1 is compressed between the lid L and the vehicle body B, and the bellows portion 2 extends as the boot 1 extends by the lid L being separated from the vehicle body B. Although the bellows portion 2 is formed into a tubular shape with a circular cross section perpendicular to the axis X direction in the present embodiment, the bellows portion 2 may be formed into another tubular shape with a square cross section, etc. Further, the bellows portion 2 can be formed of an elastically deformable material such as rubber, synthetic resin, or the like, without particular limitations, as long as the bellows portion 2 is extendable and contractable in the axis X direction.

As shown in FIG. 2, the bellows portion 2 has a bellows-like shape in which an annular bellows portion-side peak portion 21 that protrudes toward an outer side in a radial direction and an annular bellows portion-side valley portion 22 that is recessed toward an inner side in the radial direction are alternately formed along the axis X direction of the boot 1. The bellows portion-side peak portion 21 and the bellows portion-side valley portion 22 are arranged alternately and continuously in the axis X direction, thereby constituting a wall portion of the bellows portion 2. In the bellows portion 2, water, dust, etc. are suppressed from entering into an internal space formed on the inner side in the radial direction through the wall portion constituted by the bellows portion-side peak portion 21 and the bellows portion-side valley portion 22. When the boot 1 is used to be mounted to the lid opening/closing device M that is a mounting target, the pressing portion L12 of the boot-mounting member L1 is arranged in the internal space on the inner side in the radial direction of the bellows portion 2 when the boot 1 is mounted to the boot-mounting member L1 of the lid L, as shown in FIG. 1. It is to be noted that, in the present embodiment, the bellows portion 2 comprises two bellows portion-side peak portions 21 and two bellows portion-side valley portions 22, but the number of each of them is not particularly limited as long as the bellows portion 2 comprises at least one bellows portion-side peak portion 21 and at least one bellows portion-side valley portion 22 so that the bellows portion 2 is extendable and contractible in the axis X direction, and the bellows portion 2 may comprise three or more bellows portion-side peak portions 21 and three or more bellows portion-side valley portions 22. Moreover, the bellows portion 2 may comprise any structure other than the bellows portion-side peak portion 21 and the bellows portion-side valley portion 22, such as a coupling portion that couples the bellows portion-side peak portion 21 and the bellows portion-side valley portion 22, as long as the bellows portion 2 comprises at least one bellows portion-side peak portion 21 and at least one bellows portion-side valley portion 22.

As shown in FIG. 2, the extending portion 3 is a portion that is formed into a hollow tubular shape extending along the axis X direction between one end 3a and an other end 3b and is configured to be extendable and contractible in the axis X direction. One end 3a of the extending portion 3 is directly or indirectly (directly in the present embodiment) connected to the other end 2b of the bellows portion 2, and the other end 3b of the extending portion 3 is directly or indirectly (directly in the present embodiment) connected to the abutting portion AP. Although the extending portion 3 is formed integrally with the bellows portion 2 and the abutting portion AP in the present embodiment, the extending portion 3 may be formed separately from the bellows portion 2 and the abutting portion AP. Moreover, although the extending portion 3 is connected to the other end 2b of the bellows portion 2 and provided adjacent to the other end 1b of the boot 1 in the present embodiment, the extending portion 3 may be connected to one end 2a of the bellows portion 2 and provided adjacent to the one end 1a of the boot 1, or may be connected to one end 2a and the other end 2b of the bellows portion 2 on both sides thereof across the bellows portion 2 in the axis X direction and provided adjacent to one end 1a and the other end 1b of the boot 1. When the boot 1 is used to be mounted to the lid opening/closing device M that is a mounting target, the extending portion 3 is compressed as the boot 1 is compressed between the lid L and the vehicle body B, and the extending portion 3 extends as the boot 1 extends by the lid L being separated from the vehicle body B. Although the extending portion 3 is formed into a tubular shape with a circular cross section perpendicular to the axis X direction in the present embodiment, the extending portion 3 may be formed into another tubular shape with a square cross section, etc. Moreover, a constituent material of the extending portion 3 is not particularly limited as long as the extending portion 3 is extendable and contractable in the axis X direction, and the extending portion 3 can be formed of an elastically deformable material such as rubber, synthetic resin, or the like.

In the present embodiment, the extending portion 3 is configured so that a restoring force of the extending portion 3 in the axis X direction is smaller than that of the bellows portion 2 in the axis X direction when the boot 1 is in the compressed state. In this case, compared to a case where the entire boot 1 is formed of only a bellows portion 2, an increase of the restoring force of the entire boot 1 in the axis X direction, which is caused by compression of the boot 1, can be suppressed. In a case where the boot 1 is applied to the lid opening/closing device M, by suppressing the increase of the restoring force in the axis X direction, which is caused by compression of the boot 1, the lid L is suppressed from being pressed by the restoring force of the boot 1 and lifting off of a surface of the vehicle body when the lid L is in the closed position.

Figure 3A:
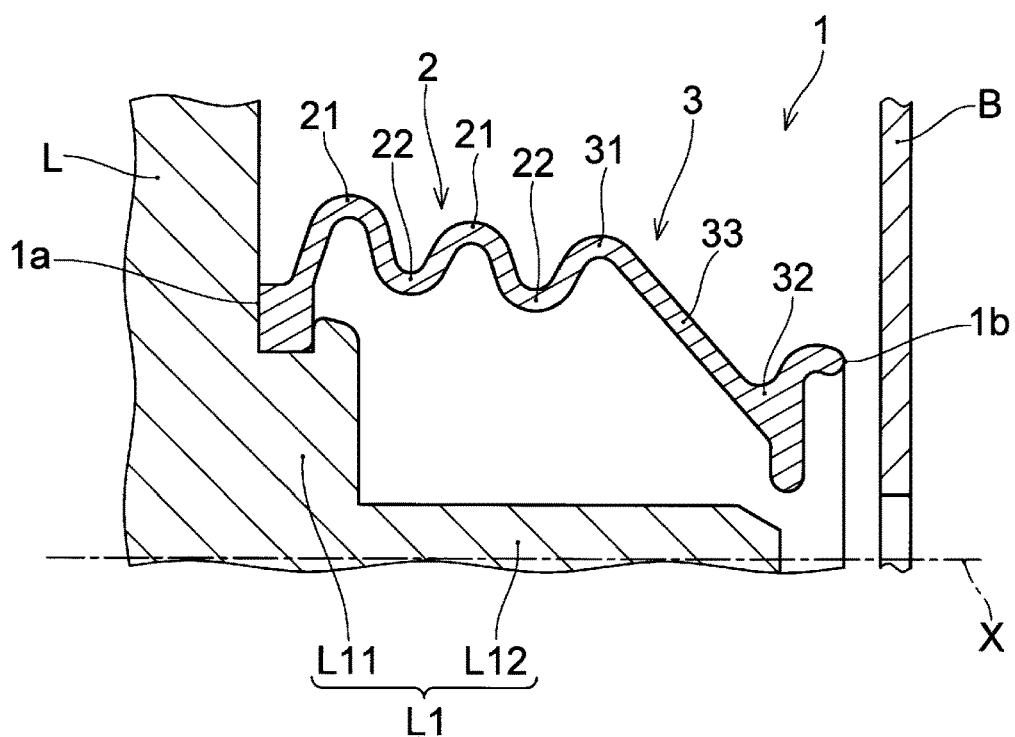
FIG. 3A is a partial sectional view of the lid opening/closing device of FIG. 1 in a state where the lid is in an opened position.
Figure 3B:
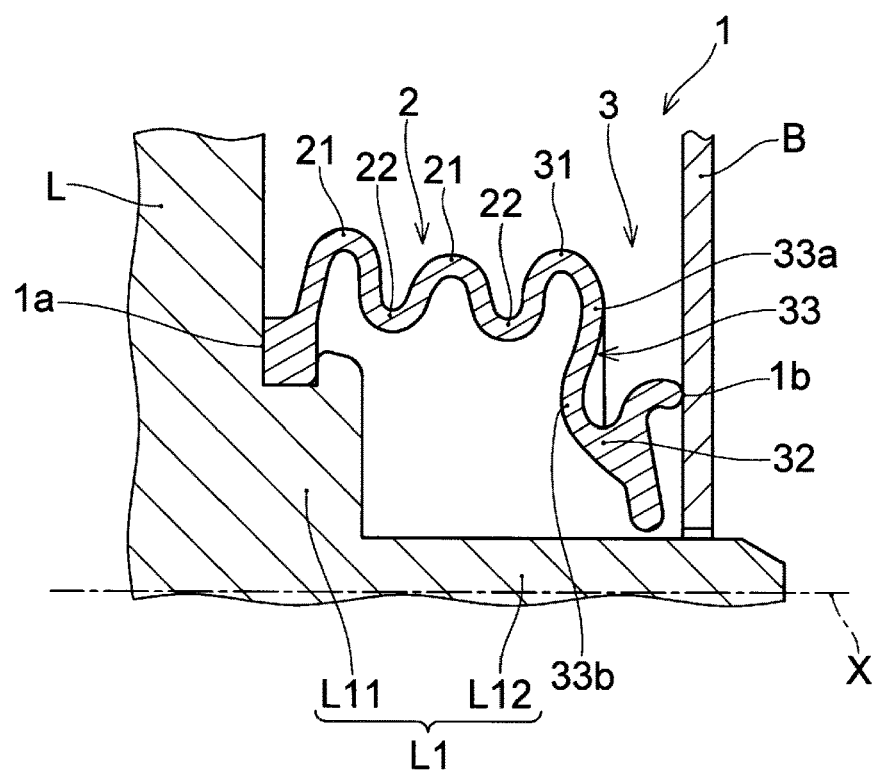
FIG. 3B is a partial sectional view of the lid opening/closing device in a state where the lid approaches a vehicle body from the state shown in FIG. 3A.
Figure 3C:
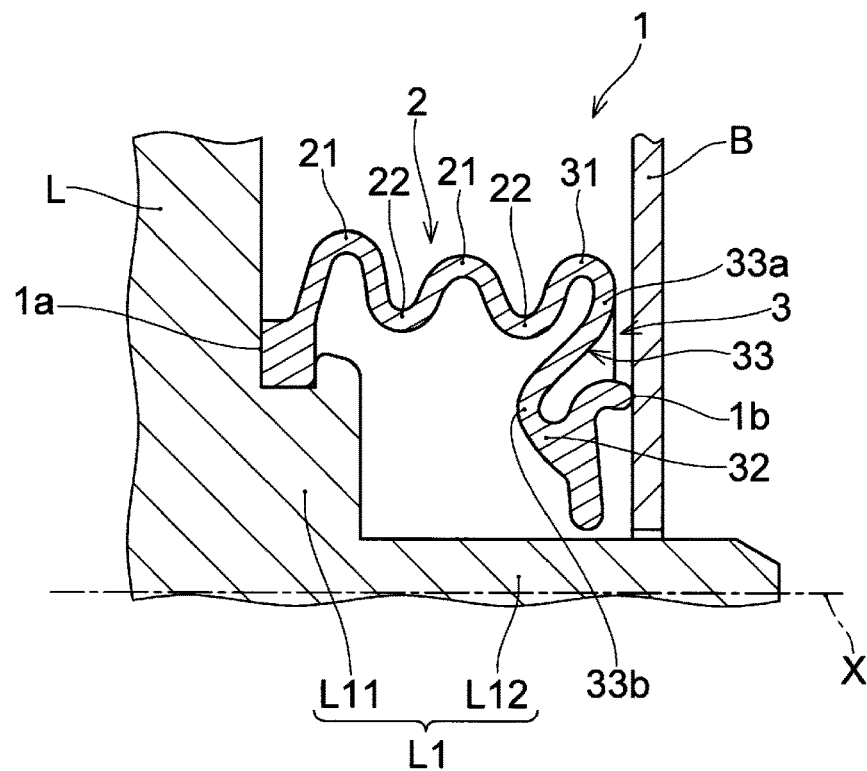
FIG. 3C is a partial sectional view of the lid opening/closing device in a state where the lid further approaches the vehicle body to be in a closed position from the state shown in FIG. 3B.
Figure 3D:
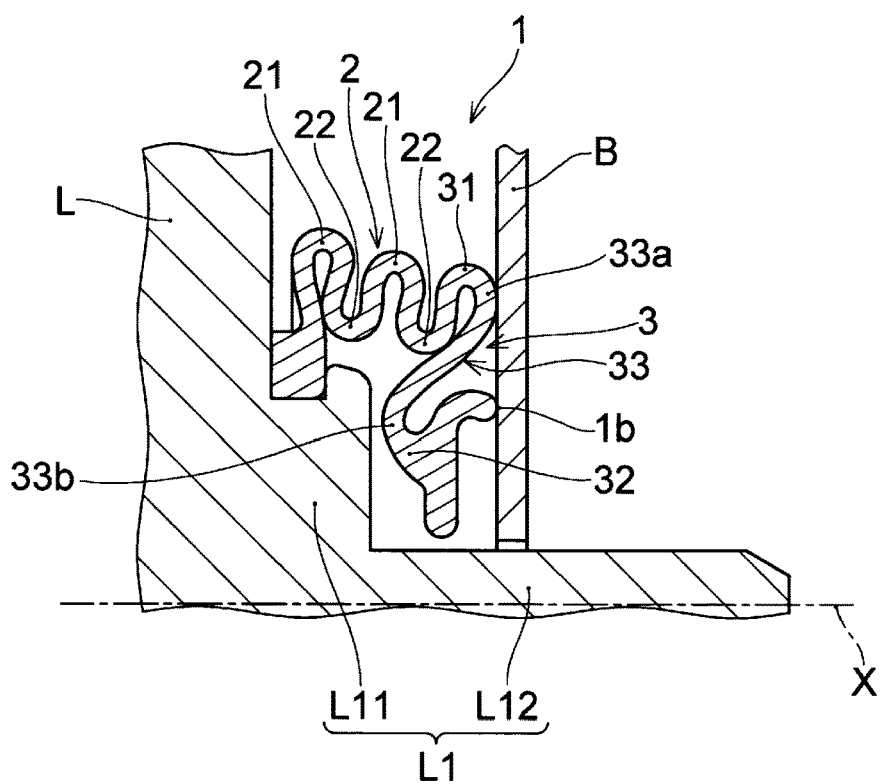
FIG. 3D is a partial sectional view of the lid opening/closing device in a state where the lid further approaches the vehicle body to be in an advanced position from the state shown in FIG. 3C.

The shape of the extending portion 3 is not particularly limited as long as the extending portion 3 is configured so that the restoring force of the extending portion 3 in the axis X direction is smaller than that of the bellows portion 2 in the axis X direction when the boot 1 is in the compressed state. In the present embodiment, as shown in FIG. 2, the extending portion 3 is formed so that an outer diameter OD1 of an end (the other end 3b in the present embodiment) of the extending portion 3 on a side opposite to a side (one end 3a side in the present embodiment) connected to the bellows portion 2 in the axis X direction is smaller than an inner diameter ID of the bellows portion-side valley portion 22 of the bellows portion 2. As shown in FIGS. 3C to 3D, the extending portion 3 is configured so that at least a part of the extending portion 3 is displaced into the bellows portion 2 (position on the inner side in the radial direction) when the boot 1 is compressed in the axis X direction. By configuring the extending portion 3 in this way, the restoring force of the extending portion 3 in the axis X direction can be made smaller than that of the bellows portion 2 even if wall thicknesses of members constituting the respective bellows portion 2 and extending portion 3 are made almost the same. This is because, as will be described in detail below, when the extending portion 3 is compressed in the axis X direction and at least a part thereof is displaced into the bellows portion 2, the extending portion 3 is curved so as to overlap in the radial direction, so that the restoring force in the radial direction increases, but the restoring force in the axis X direction does not increase as much as the restoring force in the radial direction docs.

For example, the restoring force of the boot can be reduced by making the boot thinner, but the thinning deteriorates durability, and there is a possibility that the boot may be damaged depending on handling during transportation or use. Moreover, if the boot is thickened conversely, the boot length when compressed becomes long, and if the boot is compressed to shorten the boot length, the restoring force becomes large. Therefore, it is difficult to apply such a boot to a location where a boot installation space is small, like a refueling or power-supplying space of the lid opening/closing device M. Even if such a boot can be applied to the lid opening/closing device M, a reaction force (restoring force) acting on the lid L becomes large, and the surface of the lid L lifts up with respect to the surface of the vehicle body around the lid L, creating a step between the surface of the lid L and the surface of the vehicle body around the lid L, which may impair the design.

In the present embodiment, the extending portion 3 is configured so that at least a part of the extending portion 3 is displaced into the bellows portion 2 when the boot 1 is compressed in the axis X direction, so that the restoring force can be made small without thinning the extending portion 3, and therefore, deterioration in durability and reduction in strength due to the thinning can be suppressed. Furthermore, by making the restoring force of the extending portion 3 in the axis X direction smaller than that of the bellows portion 2, the restoring force of the entire boot 1 in the axis X direction can be made small, so that, as mentioned above, when the lid L is in the closed position, the lid L is suppressed from being pressed by the reaction force (restoring force) of the boot 1 and lifting off of the surface of the vehicle body. In addition, when the boot 1 is compressed, at least a part of the extending portion 3 is displaced into the bellows portion 2, so that the boot length of the boot 1 when compressed can be shortened while suppressing an increase of the restoring force caused by the compression, when compared with a case where the entire boot 1 is formed of only a bellows portion 2. Therefore, when the boot 1 is applied to the lid opening/closing device M, the boot length of the boot 1 when compressed can be shortened, so that the boot 1 can also be accommodated in a narrow refueling or power-supplying space between the lid L and the vehicle body B.

The structure of the extending portion 3 is not particularly limited as long as the extending portion 3 is configured so that at least a part of the extending portion 3 is displaced into the bellows portion 2 when the boot 1 is compressed in the axis X direction. In the present embodiment, as shown in FIG. 2, the extending portion 3 comprises an extending portion-side peak portion 31 provided adjacent to the bellows portion 2, an extending portion-side valley portion 32 provided adjacent to one end 1a and/or the other end 1b (the other end 1b in the present embodiment) of the boot 1 in the axis X direction, and a coupling portion 33 that couples the extending portion-side peak portion 31 and the extending portion-side valley portion 32. The extending portion-side peak portion 31 protrudes to the outside in the radial direction to be formed into an annular shape, and the extending portion-side valley portion 32 is recessed to the inside in the radial direction to be formed into an annular shape. Moreover, the coupling portion 33 is formed into a tubular shape extending along the axis X direction while decreasing in diameter from the extending portion-side peak portion 31 toward the extending portion-side valley portion 32. In the present embodiment, the extending portion 3 is provided with one extending portion-side peak portion 31, one extending portion-side valley portion 32, and one coupling portion 33. As shown in FIGS. 3C and 3D, the coupling portion 33 is configured so that at least a part of the coupling portion 33 is displaced into the bellows portion 2 (position on the inner side in the radial direction) when the boot 1 is compressed in the axis X direction. With the extending portion-side peak portion 31 being provided adjacent to the bellows portion 2 and the extending portion-side valley portion 32 being provided adjacent to one end 1a and/or the other end 1b (the other end 1b in the present embodiment) of the boot 1, the coupling portion 33 becomes easy to curve to the inside in the radial direction when the boot 1 is compressed. This eliminates the need to secure an excess space for the extending portion 3 to curve to the outside in the radial direction of the boot 1.

The size of the extending portion 3 is not particularly limited as long as the extending portion 3 is configured so that at least a part of the extending portion 3 is displaced into the bellows portion 2 when the boot 1 is compressed in the axis X direction. In the present embodiment, as shown in FIG. 2, the extending portion 3 is formed so that a length D1 in the axis X direction between the extending portion-side peak portion 31 and the extending portion-side valley portion 32 is longer than a length D2 in the axis X direction between the bellows portion-side peak portion 21 and the bellows portion-side valley portion 22. Thereby, when the boot 1 is compressed, the coupling portion 33 can be easily deformed while suppressing the bellows portion 2 from deforming to the outside in the radial direction, so that at least a part of the coupling portion 33 can be easily displaced into the bellows portion 2. The fact that at least a part of the coupling portion 33 can be easily displaced into the bellows portion 2 can suppress an increase of the restoring force of the extending portion 3 in the axis X direction.

Moreover, in the present embodiment, the extending portion 3 is formed so that an outer diameter OD2 of the extending portion-side peak portion 31 is smaller than an outer diameter OD3 of the bellows portion-side peak portion 21, as shown in FIG. 2. Thereby, for example, in the case where the boot 1 is applied to the lid opening/closing device M that is a mounting target, when the boot 1 is compressed, the extending portion-side peak portion 31 can be suppressed from abutting onto the vehicle body B that is a base, so that the boot length of the boot 1 when compressed can be made shorter, as shown in FIG. 3C.

The extending portion 3 may be formed so as to have a higher rigidity in the extending portion-side valley portion 32 than in other parts of the extending portion 3. By increasing rigidity of the extending portion-side valley portion 32, deformation of the extending portion-side valley portion 32 is suppressed when the boot 1 is compressed, and accordingly, curvature of the coupling portion 33 is facilitated, so that the coupling portion 33 becomes easy to enter the inside of the bellows portion 2. Moreover, as deformation of the extending portion-side valley portion 32 is suppressed, deformation of one end 1a and/or the other end 1b (the other end 1b in the present embodiment) of the boot 1 in the axis X direction adjacent to the extending portion-side valley portion 32 is also suppressed, so that an axis of an opening at the one end 1a and/or the other end 1b of the boot 1 is suppressed from inclining. Thereby, for example, when the boot 1 is used to be mounted to the mounting target M, an abutting surface of the one end 1a and/or the other end 1b of the boot 1 onto the base B is suppressed from lifting, and water, dust, etc. are suppressed from entering through the opening at one end 1a and/or the other end 1b of the boot 1.

For the purpose of increasing rigidity of the extending portion-side valley portion 32, for example, as shown in FIG. 2, the extending portion-side valley portion 32 may be provided with a tongue piece portion 34 that extends to the inside in the radial direction from the extending portion-side valley portion 32 and is formed into an annular shape along a direction around the axis X of the extending portion-side valley portion 32. With the extending portion-side valley portion 32 adjacent to the one end 1a and/or the other end 1b (the other end 1b in the present embodiment) of the boot 1 being provided with the tongue piece portion 34 that extends to the inside in the radial direction, the size of the opening at the one end 1a and/or the other end 1b of the boot 1 can be made small, so that water, dust, etc. can be further suppressed from entering through the opening at the one end 1a and/or the other end 1b of the boot 1.

Next, with reference to FIGS. 3A to 3D and FIG. 4, an extending/contracting operation of the boot 1 will be described. The extending/contracting operation of the boot 1 will be described below by taking as an example a case where the boot 1 is applied to the lid opening/closing device M that is a mounting target, but the boot of the present invention is not limited to the following example and can also be applied to other applications. Moreover, the extending/contracting operation of the boot 1, which will be described below, is merely an example, and the extending/contracting operation of the boot of the present invention is not limited to the following example.

Figure 4:
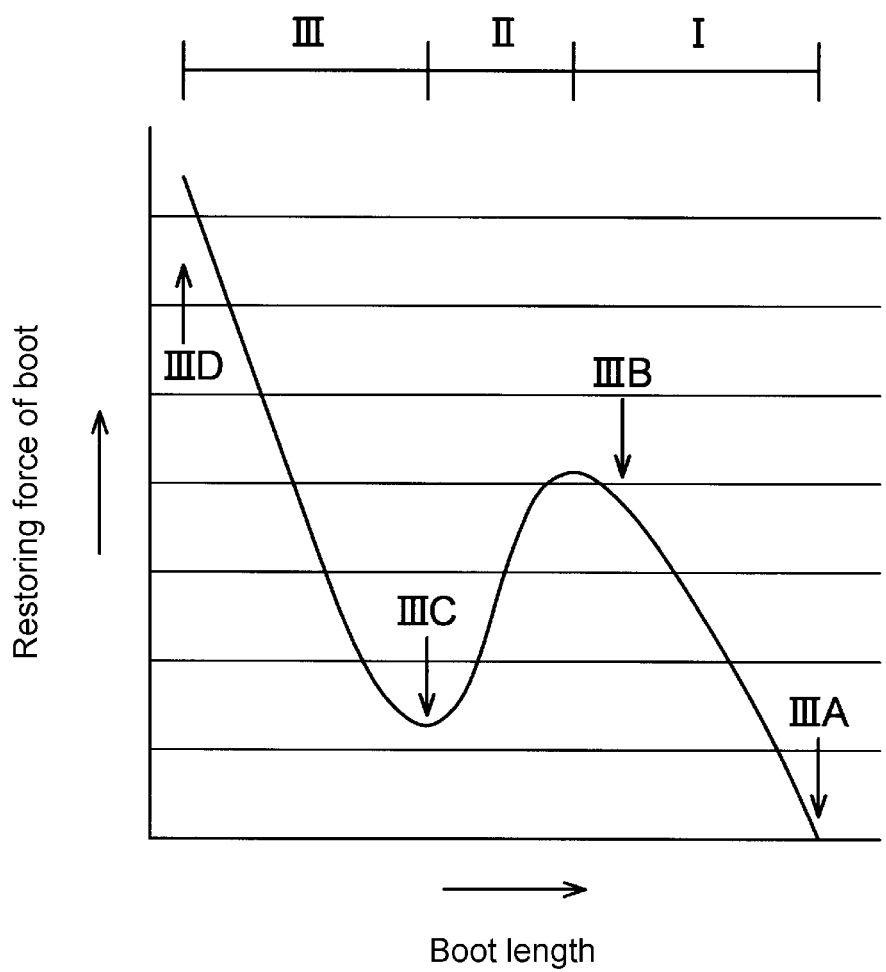
FIG. 4 is a graph schematically showing a relation between a boot length and a boot restoring force.
Figure 5:
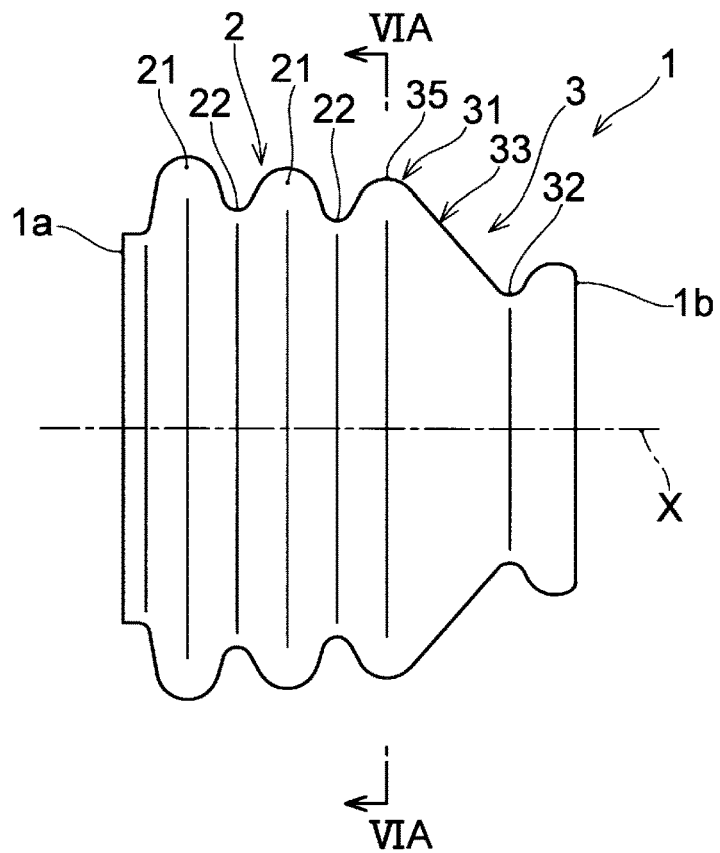
FIG. 5 is a side view of the boot having a high-rigidity portion.

FIGS. 3A to 3D show a change in extending/contracting state of the boot 1 when the lid L moves from the opened position (see FIG. 3A) via the closed position (see FIG. 3C) to the advanced position (see FIG. 3D) relative to the vehicle body B, or vice versa. Moreover, FIG. 4 schematically shows a relation between a boot length in the axis X direction of the boot 1 (horizontal axis) and a restoring force in the axis X direction of the boot 1 (vertical axis). The reference signs IIIA to IIID shown in FIG. 4 indicate boot lengths corresponding to FIGS. 3A to 3D, respectively. It is to be noted that, in FIGS. 3A to 3D, only the cross section of the upper half of the boot 1 is shown for easy understanding, but the cross section of the lower half also shows the same behavior as the cross section of the upper half.

When the lid L is in the opened position (see FIG. 3A), the other end 1b of the boot 1 does not abut onto the vehicle body B, so that the boot 1 is in an extended state of its natural length and has no restoring force in the axis X direction (see FIG. 4). When the lid L approaches the vehicle body B from the opened position, the other end 1b of the boot 1 abuts onto the vehicle body B, but at this point, the boot 1 is in an extended state of its natural length. When the lid L further approaches the vehicle body B in the axis X direction from this position, the boot 1 is compressed in the axis X direction by being pressed against the vehicle body B by the lid L into a compressed state, as shown in FIGS. 3B to 3D, while changing in restoring force as in Stages I, II, and III shown in FIG. 4. Conversely, when the lid L moves in a direction away from the vehicle body B in the axis X direction from the advanced position (see FIG. 3D), the boot 1 extends in the axis X direction due to the restoring force of the boot 1 itself and returns to the extended state of its natural length, while changing in restoring force as in Stages III, II, and I shown in FIG. 4.

Next, transitions of the boot 1 from the extended state to the compressed state and from the compressed state to the extended state will be described in detail.

When the lid L further approaches the vehicle body B from the position where the other end 1b of the boot 1 abuts onto the vehicle body B, the extending portion 3 having a relatively smaller restoring force in the axis X direction than the bellows portion 2 is compressed first, as shown in FIG. 3B. As the extending portion 3 is compressed, the extending portion-side valley portion 32 of the extending portion 3 is displaced to the bellows portion 2 side along the axis X direction, and the coupling portion 33 of the extending portion 3 is curved and displaced toward the inside of the bellows portion 2 (position on the inner side in the radial direction) while forming a peak portion-side curved portion 33a adjacent to the extending portion-side peak portion 31 and a valley portion-side curved portion 33b adjacent to the extending portion-side valley portion 32. At this time, the extending portion 3 exhibits a curved S-shaped cross section at the extending portion-side peak portion 31, the peak portion-side curved portion 33a, the valley portion-side curved portion 33b, and the extending portion-side valley portion 32. An angle of inclination of the coupling portion 33 relative to the axis X increases as the coupling portion 33 moves toward the inside of the bellows portion 2, from when the boot 1 is in the extended state. As shown in FIG. 3B, when the valley portion-side curved portion 33b moves to a vicinity of a position on the inner side in the radial direction of the extending portion-side peak portion 31, the coupling portion 33 extends at an angle close to a direction perpendicular to the axis X. The extending portion 3 compressed in the axis X direction is configured to be curved so as to overlap in a radial direction at the peak portion-side curved portion 33a and the valley portion-side curved portion 33b, respectively, so that a restoring force acts in the radial direction. The extending portion 3 pushes out the extending portion-side peak portion 31 to the outside in the radial direction by this radial restoring force. Until the boot 1 reaches this compressed state from the extended state, the restoring force of the coupling portion 33 in the axis X direction gradually increases, and due to the increased restoring force of the coupling portion 33, the bellows portion 2 is also compressed slightly in the axis X direction, gradually increasing the restoring force of the bellows portion 2 in the axis X direction. Therefore, as shown in FIG. 4 as Stage I, the restoring force of the boot 1 increases as the boot length decreases.

When the lid L further approaches the vehicle body B from the position shown in FIG. 3B, the valley portion-side curved portion 33b of the coupling portion 33 is displaced to a position on the inner side in the radial direction of the bellows portion-side valley portion 22 of the bellows portion 2, and the coupling portion 33 is inclined to a side opposite to a side when extended, relative to the axis X, as shown in FIG. 3C. With the coupling portion 33 being inclined to the side opposite to the side when extended, relative to the axis X, the extending portion-side peak portion 31 being pushed out to the outside in the radial direction is displaced to the inside in the radial direction, and the restoring force of the extending portion 3 in the axis X direction decreases. Accordingly, the bellows portion 2 being slightly compressed by the restoring force of the extending portion 3 extends slightly along the axis X direction, and the restoring force of the bellows portion 2 in the axis X direction also decreases. Therefore, as shown in FIG. 4 as Stage II, the restoring force of the boot 1 decreases as the boot length decreases. Again, as shown in FIG. 3C, when the extending portion 3 is compressed in the axis X direction, the extending portion 3 is configured to be curved so as to overlap in a radial direction at the peak portion-side curved portion 33a and the valley portion-side curved portion 33b, respectively, so that a restoring force acts in the radial direction. Thereby, the restoring force of the extending portion 3 in the axis X direction becomes small, and the restoring force of the boot 1 in the axis X direction also becomes small.

When the lid L further approaches the vehicle body B from the closed position shown in FIG. 3C, the extending portion 3 is displaced to the bellows portion 2 side in the axis X direction without being substantially deformed, and the bellows portion 2 is compressed along the axis X direction, so that the valley portion-side curved portion 33b of the coupling portion 33 is displaced to a position on the inner side in the radial direction of the bellows portion-side peak portion 21 of the bellows portion 2, as shown in FIG. 3D. With the length of the bellows portion 2 in the axis X direction being shortened, the restoring force of the bellows portion 2 in the axis X direction increases. Thereby, as shown in FIG. 4 as Stage III, the restoring force of the boot 1 increases as the boot length decreases. Also in this stage III, the extending portion 3 is configured to be curved so as to overlap in the radial direction at the peak portion-side curved portion 33a and the valley portion-side curved portion 33b, so that a restoring force acts mainly in the radial direction. Moreover, the bellows portion 2 is configured to be curved so as to overlap in the axis X direction, so that a restoring force acts mainly in the axis X direction. Thereby, the restoring force of the extending portion 3 in the axis X direction becomes small and the restoring force of the bellows portion 2 in the axis X direction becomes large, so that the restoring force of the boot 1 in the axis X direction is achieved mainly by the increased restoring force of the bellows portion 2.

Conversely, when the lid L moves away from the vehicle body B in the axis X direction from the advanced position shown in FIG. 3D, the bellows portion 2 having a larger restoring force in the axis X direction than the extending portion 3 extends first, as shown in FIG. 3C. The bellows portion 2 extends to a state close to its natural length and its restoring force is decreased, and the extending portion 3 is displaced from the inside of the bellows portion 2 toward the outside of the bellows portion 2 in the axis X direction. Since the restoring force of the bellows portion 2 in the axis X direction decreases as the bellows portion 2 extends, the restoring force of the boot 1 decreases as the boot length becomes long with the extension of the bellows portion 2, as shown in FIG. 4 as Stage III.

When the lid L moves away from the vehicle body B in the axis X direction from the closed position shown in FIG. 3C, the extending portion 3 extends due to the restoring force of the extending portion 3 in the axis X direction instead of the bellows portion 2 having decreased restoring force, as shown in FIG. 3B. At this time, the valley portion-side curved portion 33b of the extending portion 3 is displaced from the inside of the bellows portion 2 to the outside of the bellows portion 2 in the axis X direction, and the angle of the coupling portion 33 relative to the axis X gradually increases. Then, the coupling portion 33 extends at an angle close to a direction perpendicular to the axis X, and a restoring force to the outside in the radial direction acts to push out the extending portion-side peak portion 31 to the outside in the radial direction. Until this time point, the restoring force of the coupling portion 33 in the axis X direction gradually increases, and due to the increased restoring force of the coupling portion 33, the bellows portion 2 is also compressed slightly in the axis X direction, gradually increasing the restoring force of the bellows portion 2 in the axis X direction. Therefore, as shown in FIG. 4 as Stage II, the restoring force of the boot 1 increases as the boot length increases.

When the lid L moves in the direction away from the vehicle body B in the axis X direction from the position shown in FIG. 3B, the coupling portion 33 is displaced from the inside of the bellows portion 2 to a position on the outside in the axis X direction and is inclined to a side opposite to a side when maximally compressed, relative to the axis X. Thereby, the peak portion-side curved portion 33a and the valley portion-side curved portion 33b disappear from the coupling portion 33, so that the curved coupling portion 33 is restored to its original state, and the extending portion-side peak portion 31 having pushed out to the outside in the radial direction is restored to its original position. At this stage, as shown in FIG. 4 as Stage I, the restoring force of the boot 1 decreases as the boot length increases.

As can be understood from the descriptions above, the boot 1 is configured to have a local minimum restoring force state (state between Stage II and Stage III in FIG. 4) where the restoring force in the axis X direction increases (or decreases) after the restoring force decreases (or increases), as a compression ratio increases (or decreases), between the extended state of its natural length and the most compressed state. The boot 1 can maintain the compressed state in a quasi-stable manner in the local minimum restoring force state during the entire compression process. When the boot 1 is applied to the lid opening/closing device M that is a mounting target, the lid L in the closed position can be further suppressed from lifting off of the surface of the vehicle body by setting the closed position of the lid L to a position corresponding to this local minimum restoring force state.

As mentioned above, when the boot 1 is used so that an end in the axis X direction (the other end 1b in the present embodiment) is a free end, the boot 1 needs to be restored to the extended state only by the restoring force of the boot 1 itself without any assistance of a force from the outside when restoring from the compressed state to the extended state. For the purpose of easily restoring the boot 1 to the extended state only by the restoring force of the boot itself, in the boot 1 shown in FIGS. 5 to 10, the boot 1 is provided with a high-rigidity portion 35 having a higher rigidity than other parts of the extending portion 3 in the circumferential direction in a part of the extending portion 3 in the circumferential direction. The extending portion 3 is configured so that the restoring force of the extending portion 3 in the axis X direction is smaller than that of the bellows portion 2 in the axis X direction when the boot 1 is in a compressed state. However, by providing the high-rigidity portion 35 in the part of the extending portion 3 in the circumferential direction, the extending portion 3 can be easily restored to the extended state. Specifically, by increasing the rigidity of the part of the extending portion 3 in the circumferential direction compared to the other parts in the same circumferential direction, the timing of a restoring operation when the extending portion 3 is restored to the extended state can be shifted in the circumferential direction, and the restoring operation can be facilitated. For example, in the present embodiment, as mentioned above regarding the transition from the state shown in FIG. 3C to the state shown in FIG. 3B, it is necessary to push out the entire circumferential direction of the extending portion-side peak portion 31 to the outside in the radial direction at the same time in attempting to extend the extending portion 3 in the axis X direction at all of the parts of the extending portion 3 in the circumferential direction. In order to do so, it is necessary to increase the outer diameter of the extending portion-side peak portion 31, and a large restoring force is required. On the other hand, by providing the high-rigidity portion 35 in the part of the extending portion 3 in the circumferential direction, the extending portion-side peak portion 31 on an extension line in the axis X direction of the circumferential position where the high-rigidity portion 35 is provided is first displaced to the outside in the radial direction without increasing the diameter of the extending portion-side peak portion 31, and the other parts of the extending portion-side peak portion 31 in the circumferential direction are displaced following the displaced part, so that a restoring operation can be performed without requiring much force.

The position of the high-rigidity portion 35 in the circumferential direction is not particularly limited as long as the high-rigidity portion 35 is provided in a part of the extending portion 3 in the circumferential direction and can shift the timing of the restoring operation of the extending portion 3 in the circumferential direction. In the examples shown in FIGS. 5 to 9, the high-rigidity portion 35 is provided only at one location in the circumferential direction of the extending portion 3, but may be provided at multiple locations in the circumferential direction of the extending portion 3. In the case where the high-rigidity portion 35 is provided at multiple locations in the circumferential direction of the extending portion 3, the respective high-rigidity portions 35 are preferably provided at positions asymmetrical to the axis X (positions shifted in the circumferential direction from positions that are point symmetrical to the axis X). By providing the high-rigidity portion 35 at positions asymmetrical to the axis X, the outer diameter of the extending portion-side peak portion 31 is suppressed from increasing by pushing out multiple parts of the extending portion-side peak portion 31 in a direct opposite direction when restoring operations are performed at multiple circumferential positions where the high-rigidity portion 35 is provided, so that the extending portion-side peak portion 31 can be partially easily pushed out to the outside in the radial direction, and the restoring operation of the extending portion 3 can be facilitated.

The position of the high-rigidity portion 35 in the axis X direction is not particularly limited as long as the high-rigidity portion 35 is provided in a part of the extending portion 3 in the circumferential direction and can shift the timing of the restoring operation of the extending portion 3 in the circumferential direction. For example, in the embodiments shown in FIG. 5 and FIGS. 6A to 6B, the high-rigidity portion 35 has an extension portion 35a that is provided in a part of the extending portion-side peak portion 31 in the circumferential direction and that extends toward the inside and/or the outside of the extending portion-side peak portion 31 in the radial direction (the inside in the radial direction in the illustrated example). The high-rigidity portion 35 is formed to be thicker thickness than other parts of the extending portion 3. By providing the high-rigidity portion 35 on the extending portion-side peak portion 31, the extending portion-side peak portion 31 is displaced to the outside in the radial direction when the extending portion 3 is restored, and a restoring force to return to the original position after that is increased, so that the extending portion 3 becomes easy to be restored as a whole. Moreover, by increasing rigidity by increasing the thickness, the high-rigidity portion 35 can be formed more easily compared with a case of increasing rigidity by using other members. Furthermore, in a case where the boot 1 is manufactured using a mold, since the mold is easily molded, the boot 1 can be easily manufactured.

Figure 6A:
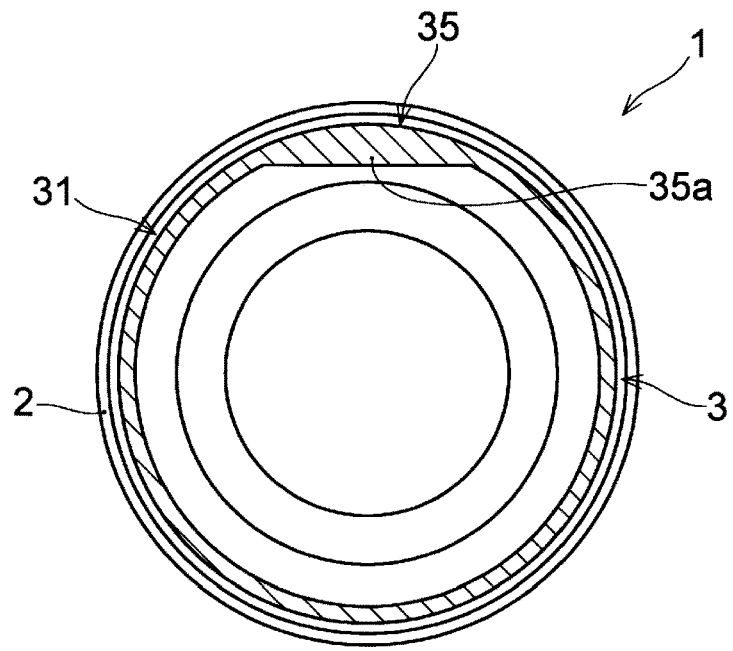
FIG. 6A is a sectional view taken along the line VIA-VIA in FIG. 5.
Figure 6B:
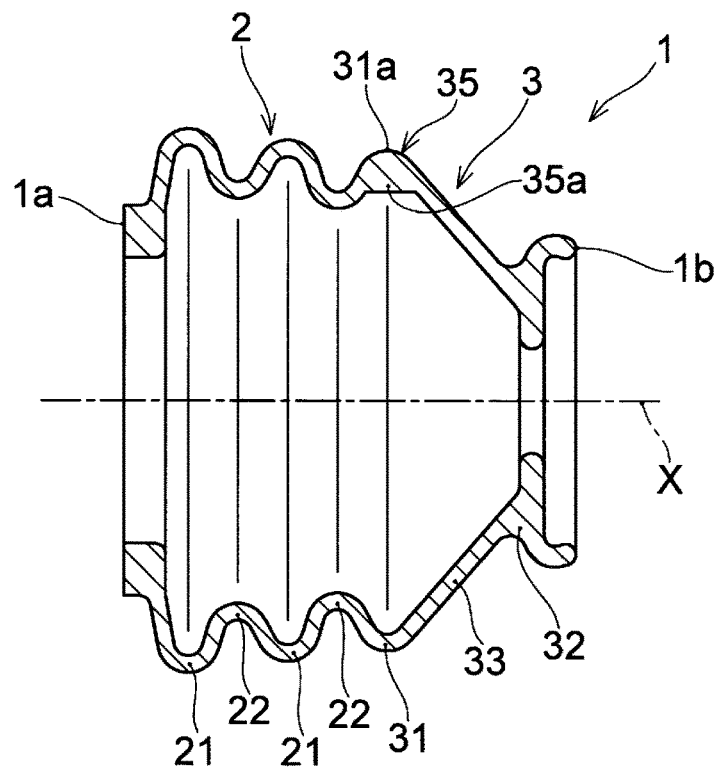
FIG. 6B is a sectional view of the boot of FIG. 5 along an axis direction.

The thickness of the high-rigidity portion 35 provided on the extending portion-side peak portion 31 is not particularly limited as long as the high-rigidity portion 35 is formed thicker than the other parts of the extending portion 3. However, from the viewpoint of increasing the restoring force of the part of the extending portion-side peak portion 31 provided with the high-rigidity portion 35, the maximum thickness of the extending portion-side peak portion 31 in the high-rigidity portion 35 is preferably 1.2 times or more, and further preferably 1.25 times or more, of the thicknesses of the other parts of the extending portion 3. Moreover, from the viewpoint of facilitating deformation during compression of the part of the extending portion-side peak portion 31 provided with the high-rigidity portion 35, the maximum thickness of the extending portion-side peak portion 31 in the high-rigidity portion 35 is preferably 1.5 times or less, further preferably 1.4 times or less, and even further preferably 1.3 times or less, of the thicknesses of the other parts of the extending portion 3. Furthermore, as shown in FIG. 6B, the high-rigidity portion 35 of the extending portion-side peak portion 31 is preferably formed so as to have the maximum thickness at an apex portion 31a of the extending portion-side peak portion 31 which is a portion having the largest outer diameter, of the extending portion-side peak portion 31, in the axis X direction. By forming the high-rigidity portion 35 so as to have the maximum thickness at the apex portion 31a of the extending portion-side peak portion 31, deformation of the part of the extending portion-side peak portion 31 provided with the high-rigidity portion 35 during compression can be facilitated.

The length in the circumferential direction of the high-rigidity portion 35 provided on the extending portion-side peak portion 31 is not particularly limited as long as the high-rigidity portion 35 is provided in a part of the extending portion-side peak portion 31 in the circumferential direction. However, from the viewpoint of increasing the restoring force of the part of the extending portion-side peak portion 31 provided with the high-rigidity portion 35, the length of the high-rigidity portion 35 in the circumferential direction is preferably 1/20 or more, further preferably 1/15 or more, and even further preferably 1/10 or more, of the length of the extending portion-side peak portion 31 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the extending portion-side peak portion 31 in the circumferential direction. Furthermore, as shown in FIG. 6A, the high-rigidity portion 35 is preferably formed so that the thickness thereof continuously decreases from the maximum thickness part toward both sides in the circumferential direction, in the circumferential direction of the extending portion-side peak portion 31. Thereby, when the extending portion 3 is restored from the compressed state to the extended state, the extending portion 3 is gradually restored from the maximum thickness part to the both sides in the circumferential direction, in the circumferential direction of the extending portion-side peak portion 31, so that the extending portion 3 can be more easily restored to the extended state.

Figure 7:
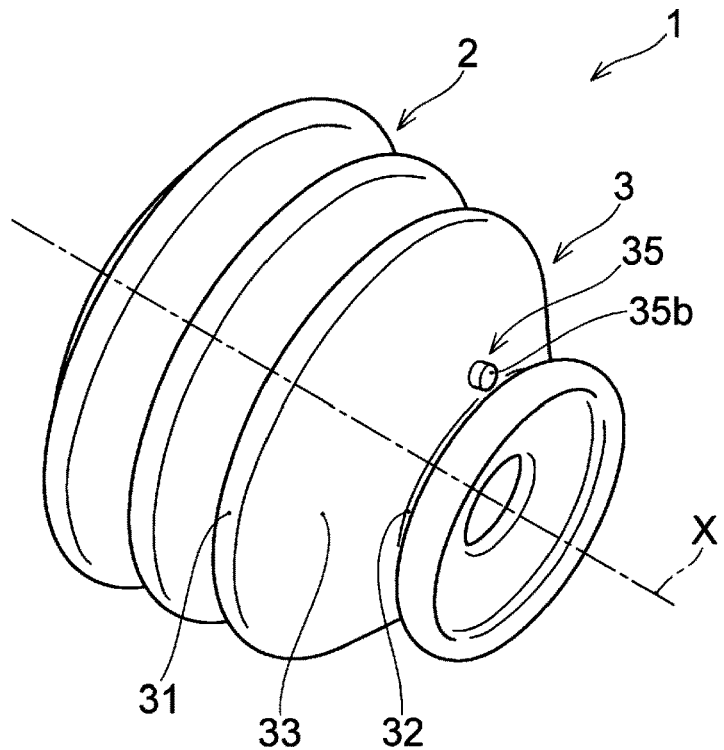
FIG. 7 is a perspective view of a variation of the boot.
Figure 8:
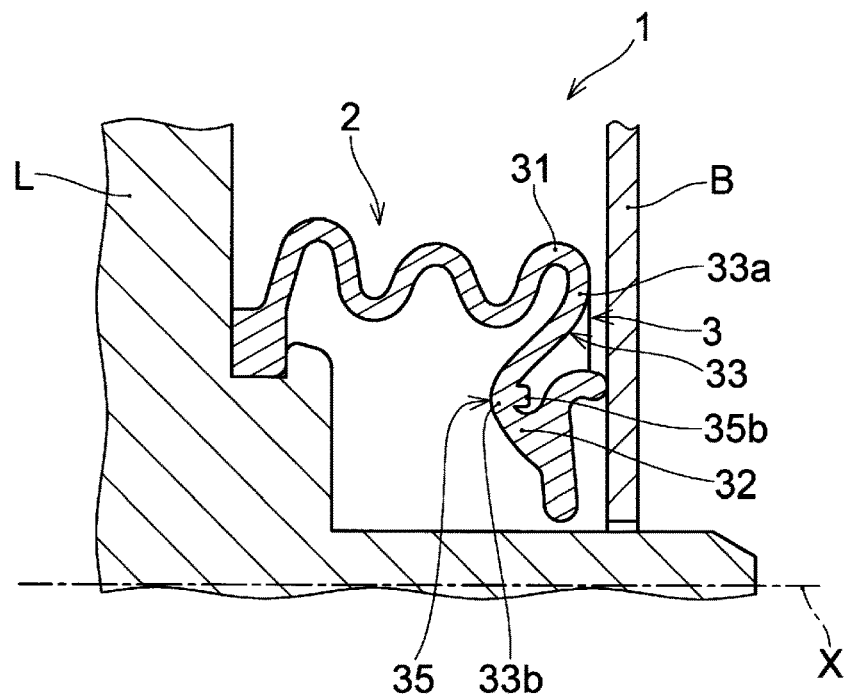
FIG. 8 is a partial sectional view of the lid opening/closing device in a state where the lid is in a closed position in the lid opening/closing device to which the boot of FIG. 7 is mounted.

For example, as in the variations shown in FIGS. 7 and 8, the high-rigidity portion 35 may have a projection 35b that is provided at a position adjacent to the extending portion-side valley portion 32 in the coupling portion 33, which is a position where the coupling portion 33 is curved when the boot 1 is compressed (the valley portion-side curved portion 33b), and that protrudes from the coupling portion 33 to the inside and/or the outside in the radial direction (the outside in the radial direction in the illustrated example). With the high-rigidity portion 35 having the projection 35b, the high-rigidity portion 35 is formed to be thicker thickness than other parts of the extending portion 3. With the high-rigidity portion 35 being provided on the valley portion-side curved portion 33b adjacent to the extending portion-side valley portion 32, a restoring force of a part of the valley portion-side curved portion 33b provided with the high-rigidity portion 35 increases, thereby increasing a force of pushing out the extending portion-side peak portion 31 to the outside in the radial direction, so that the extending portion 3 can be more easily restored to the extended state. Again, by increasing rigidity by increasing the thickness, the high-rigidity portion 35 can be formed more easily compared with the case of increasing rigidity by using other members. Furthermore, in a case where the boot 1 is manufactured using a mold, since the mold is easily molded, the boot 1 can be easily manufactured.

The thickness of the high-rigidity portion 35 provided adjacent to the extending portion-side valley portion 32 is not particularly limited as long as the high-rigidity portion 35 is formed thicker compared with the other parts of the extending portion 3. However, from the viewpoint of increasing the restoring force of the part of the extending portion 3 provided with the high-rigidity portion 35 in the circumferential direction, the thickness of the high-rigidity portion 35 is preferably 1.1 times or more, further preferably 1.3 times or more, even further preferably 1.5 times or more, of the thickness of the other parts of the extending portion 3. Moreover, from the viewpoint of facilitating deformation, during compression, of the part of the extending portion 3 provided with the high-rigidity portion 35 in the circumferential direction, the thickness of the high-rigidity portion 35 is preferably 2 times or less, further preferably 1.8 times or less, even further preferably 1.6 times or less, of the thickness of the other parts of the extending portion 3.

The length in the circumferential direction of the high-rigidity portion 35 is not particularly limited as long as the high-rigidity portion 35 is provided in a part of the coupling portion 33 in the circumferential direction in the valley portion-side curved portion 33b. However, from the viewpoint of increasing the restoring force of the part of the coupling portion 33 provided with the high-rigidity portion 35, the length of the high-rigidity portion 35 in the circumferential direction is preferably 1/20 or more, further preferably 1/15 or more, and even further preferably 1/10 or more, of the length of the coupling portion 33 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the coupling portion 33 in the circumferential direction.

Figure 9:
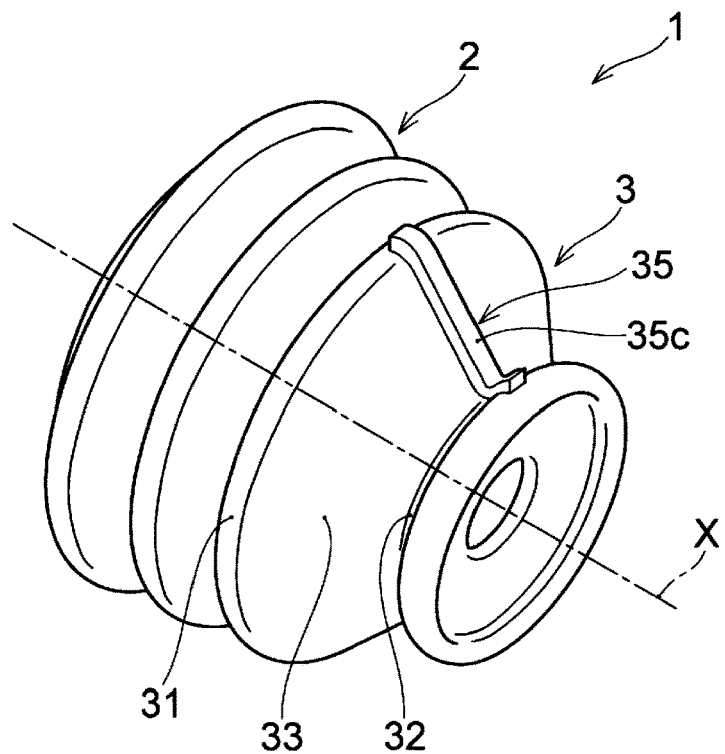
FIG. 9 is a perspective view of another variation of the boot.

For example, as in the variation shown in FIG. 9, the high-rigidity portion 35 may be provided continuously so as to extend from the extending portion-side peak portion 31 through the coupling portion 33 to the extending portion-side valley portion 32 along a plane including the axis X. The high-rigidity portion 35 has a protruding portion 35c that protrudes from the extending portion 3 to the inside and/or the outside in the radial direction (the outside in the radial direction in the illustrated example), where the protruding portion 35c is provided continuously so as to extend from the extending portion-side peak portion 31 through the coupling portion 33 to the extending portion-side valley portion 32 along the plane including the axis X. With the high-rigidity portion 35 having the protruding portion 35c, the high-rigidity portion 35 is formed to be thicker thickness than the other parts of the extending portion 3. By providing the high-rigidity portion 35 over substantially the entire length of the extending portion 3 in the axis X direction, a restoring force of the part of the extending portion 3 provided with the high-rigidity portion 35 in the circumferential direction increases, thereby increasing a force of pushing out the extending portion-side peak portion 31 to the outside in the radial direction, so that the extending portion 3 can be more easily restored to the extended state. It is to be noted that, in the present embodiment, the high-rigidity portion 35 is provided only in the extending portion 3, without being provided in the bellows portion 2.

The thickness of the high-rigidity portion 35 provided extending from the extending portion-side peak portion 31 through the coupling portion 33 to the extending portion-side valley portion 32 is not particularly limited as long as the high-rigidity portion 35 is formed thicker compared with the other parts of the extending portion 3. However, from the viewpoint of increasing the restoring force of the part of the extending portion 3 provided with the high-rigidity portion 35 in the circumferential direction, the thickness of the high-rigidity portion 35 is preferably 1.1 times or more, further preferably 1.3 times or more, even further preferably 1.5 times or more, of the thickness of the other parts of the extending portion 3. Moreover, from the viewpoint of facilitating deformation, during compression, of the part of the extending portion 3 provided with the high-rigidity portion 35 in the circumferential direction, the thickness of the high-rigidity portion 35 is preferably 2 times or less, further preferably 1.8 times or less, even further preferably 1.6 times or less, of the thickness of the other parts of the extending portion 3.

The length in the circumferential direction of the high-rigidity portion 35 is not particularly limited as long as the high-rigidity portion 35 is provided in a part of the coupling portion 33 in the circumferential direction. However, from the viewpoint of increasing the restoring force of the part of the coupling portion 33 provided with the high-rigidity portion 35, the length of the high-rigidity portion 35 in the circumferential direction is preferably 1/20 or more, further preferably 1/15 or more, and even further preferably 1/10 or more, of the length of the coupling portion 33 in the circumferential direction. Moreover, from the viewpoint of increasing asymmetry of pushing-out of the extending portion-side peak portion 31 to the outside in the radial direction, the length of the high-rigidity portion 35 in the circumferential direction is preferably 1/4 or less, further preferably 1/6 or less, even further preferably 1/8 or less, of the length of the coupling portion 33 in the circumferential direction.

The invention claimed is:

1. A tubular boot that extends along an axis direction and is extendable and contractable in the axis direction, the boot comprising:
    a bellows portion alternately having a bellows portion-side peak portion and a bellows portion-side valley portion along the axis direction, and
    an extending portion connected adjacent to the bellows portion in the axis direction and provided adjacent to one end or an other end of the boot in the axis direction,
    wherein the extending portion is formed so that an outer diameter of an end of the extending portion on a side opposite to a side connected to the bellows portion in the axis direction is smaller than an inner diameter of the bellows portion-side valley portion of the bellows portion,
    wherein the extending portion is configured so that at least a part of the extending portion is displaced into the bellows portion when the boot is compressed in the axis direction,
    wherein the bellows portion is configured to be compressed in the axis direction after at least a part of the extending portion is displaced into the bellows portion when the boot is compressed in the axis direction, and
    wherein the boot is configured to have a local minimum restoring force state where a restoring force in the axis direction increases after the restoring force decreases, as a compression ratio increases, between an extended state and a compressed state.

2. The boot of claim 1, wherein the extending portion comprises an extending portion-side peak portion provided adjacent to the bellows portion, an extending portion-side valley portion provided adjacent to the one end or the other end of the boot in the axis direction, and a coupling portion that couples the extending portion-side peak portion and the extending portion-side valley portion, and
    wherein the coupling portion is configured so that at least a part of the coupling portion is displaced into the bellows portion when the boot is compressed in the axis direction.

3. The boot of claim 2, wherein the extending portion is formed so that a length in the axis direction between the extending portion-side peak portion and the extending portion-side valley portion is longer than a length in the axis direction between the bellows portion-side peak portion and the bellows portion-side valley portion.

4. The boot of claim 2, wherein the extending portion is formed so that an outer diameter of the extending portion-side peak portion is smaller than an outer diameter of the bellows portion-side peak portion.

5. The boot of claim 2, wherein the extending portion is formed so as to have a higher rigidity in the extending portion-side valley portion than in other parts of the extending portion.

6. The boot of claim 1, wherein the extending portion is configured to be curved so as to overlap in a radial direction so that a restoring force can act in the radial direction, when the extending portion is compressed in the axis direction.

7. A tubular boot that extends along an axis direction and is extendable and contractable in the axis direction, the boot comprising:
- a bellows portion alternately having a bellows portion-side peak portion and a bellows portion-side valley portion along the axis direction, and
- an extending portion connected adjacent to the bellows portion in the axis direction and provided adjacent to one end or an other end of the boot in the axis direction,
- wherein the extending portion is formed so that an outer diameter of an end of the extending portion on a side opposite to a side connected to the bellows portion in the axis direction is smaller than an inner diameter of the bellows portion-side valley portion of the bellows portion,
- wherein the extending portion is configured so that at least a part of the extending portion is displaced into the bellows portion when the boot is compressed in the axis direction,
- wherein the extending portion comprises an extending portion-side peak portion provided adjacent to the bellows portion, an extending portion-side valley portion provided adjacent to the one end or the other end of the boot in the axis direction, and a coupling portion that couples the extending portion-side peak portion and the extending portion-side valley portion,
- wherein the coupling portion is configured so that at least a part of the coupling portion is displaced into the bellows portion when the boot is compressed in the axis direction, and
- wherein the boot is configured to have a local minimum restoring force state where a restoring force in the axis direction increases after the restoring force decreases, as a compression ratio increases, between an extended state and a compressed state.

* * * * *